(12) United States Patent
Middel (10) Patent No.: US 9,505,351 B2
(45) Date of Patent: Nov. 29, 2016

(54) MOUNT FOR A MOTOR-VEHICLE ACCESSORY

(71) Applicant: Dietmar Middel, Olpe (DE)

(72) Inventor: Dietmar Middel, Olpe (DE)

(73) Assignee: KDK AUTOMOTIVE GMBH, Waechtersbach (DE)

( * ) Notice: Subject to any disclaimer, the term of this patent is extended or adjusted under 35 U.S.C. 154(b) by 143 days.

(21) Appl. No.: 14/533,122

(22) Filed: Nov. 5, 2014

(65) Prior Publication Data

US 2015/0203047 A1   Jul. 23, 2015

(30) Foreign Application Priority Data

Nov. 14, 2013 (DE) .................. 20 2013 105 134 U (51) Int. Cl.
| | |
|---|---|
| B60R 11/00 | (2006.01) |
| B60R 7/00 | (2006.01) |
| B60R 9/00 | (2006.01) |
| B60R 7/04 | (2006.01) |
| B60N 2/46 | (2006.01) |
| F16B 5/06 | (2006.01) |

(52) U.S. Cl.
CPC ............. B60R 7/04 (2013.01); B60N 2/466 (2013.01); B60N 2/4606 (2013.01); F16B 5/0642 (2013.01); F16B 5/0657 (2013.01)

(58) Field of Classification Search
CPC ........ B60N 2/4606; B60N 2/466; B60R 7/04
See application file for complete search history.

(56) References Cited

U.S. PATENT DOCUMENTS

| | | | | |
|---|---|---|---|---|
| 5,106,143 A * | 4/1992 | Soeters | ................... | B60N 2/46 248/222.51 |
| 6,921,118 B2 * | 7/2005 | Clark | ................... | B60N 2/4686 296/24.34 |
| 7,055,882 B2 * | 6/2006 | Santaolalla Gil | ......... | B60R 7/04 224/311 |
| 7,152,897 B2 * | 12/2006 | Bonnes | ................... | B60N 2/072 296/35.1 |
| 7,222,906 B2 * | 5/2007 | Sakakibara | ............... | B60R 7/04 296/24.34 |
| 7,429,068 B2 * | 9/2008 | Busha | ................... | B60N 3/101 296/24.34 |
| 7,591,498 B2 * | 9/2009 | Busha | ................... | B60N 2/4686 224/281 |
| 7,854,470 B2 * | 12/2010 | Yamaki | ................ | B60N 2/4235 296/187.12 |
| 2006/0071496 A1* | 4/2006 | Sturt | ........................ | B60R 7/04 296/24.34 |
| 2013/0057010 A1* | 3/2013 | Vasko | ...................... | B60R 7/04 296/24.34 |
| 2014/0361567 A1* | 12/2014 | Singh | ........................ | E05D 7/02 296/37.8 |

* cited by examiner

*Primary Examiner* — Brian D Nash
*Assistant Examiner* — Derek Battisti
(74) *Attorney, Agent, or Firm* — Andrew Wilford (57) ABSTRACT

The invention relates to a mount for an accessory of the interior of a motor vehicle on components of the vehicle body, comprising a bracket (8) mounted to the vehicle body and a support (1) removably connected to the bracket (8) as part of the accessory, with the bracket (8) forming a support surface against which the support piece (1) rests with the retaining surface, with at least one hook (9) projecting from the support surface of the bracket (8) that traverses a suitable hole (2) of the retaining surface of the support piece (1) and projects past the retaining surface on the side facing away from the bracket (8), with at least one latch bar (4) being slidable parallel to its retaining surface that, before installation, forms a cutout (5 and 6) for the hook (9) and that fits with the hook (9) in the desired installed position.

18 Claims, 13 Drawing Sheets

MOUNT FOR A MOTOR-VEHICLE ACCESSORY

FIELD OF THE INVENTION

The invention relates to a mount for an accessory of the interior of a motor vehicle on components of the vehicle body, comprising a bracket mounted or mountable on the vehicle body and a support removably connected to the bracket as part of the accessory.

BACKGROUND OF THE INVENTION

Such a mount is known from the prior art. The bracket that is mounted or mountable on the vehicle body is customarily mounted on a part of the vehicle body. For example, to this end, the bracket is welded to the shell of the vehicle body or connected to the vehicle body structure in some other suitable manner. A support is removably connected to the bracket as part of the accessory. To this end, the parts are customarily attached to one another by a screw connection, with corresponding threaded parts, for example snap nuts or weld nuts, needing to be solidly attached to the bracket. After the support has been correctly positioned on the bracket, the screws may be inserted and the parts may be connected to one another by the screws. Such a mount is viewed as disadvantageous insofar as additional fasteners must be provided and arranged in order to connect the parts to one another. Moreover, such fasteners, which cannot be lost, must be activated by appropriate handling on the part of the installer in order to connect the parts to one another by screws. The overall production expense required to complete this mount is in need of improvement with regard to the required fasteners as well as with regard to the installation expense.

OBJECT OF THE INVENTION

Based on this prior art, the object of the invention is to create a mount of the described type in which the support may be attached to the bracket in a simple manner without requiring any additional screw fasteners and without requiring a time-consuming installation effort.

SUMMARY OF THE INVENTION

In order to attain this object, the invention proposes that
the bracket forms a support surface or support surface parts against which the support rests with the retaining surface or retaining surface parts,
at least one hook projects from the support surface or the support surface parts of the bracket that engages through an appropriate hole in the retaining surface or retaining surface parts of the support and projects past the retaining surface or the retaining surface parts on the side facing away from the bracket,
at least one latch bar is slidable on the support parallel to its retaining surface or retaining surface parts, the latch bar forming a cutout for the hook in a pre-mounting position and in which fits the hook in the desired mounted position.

According to this embodiment, the bracket forms a support surface or support surface parts against which the support rests with a retaining surface or retaining surface parts. As is customary, the bracket is fixed to the vehicle body. Subsequently, the support piece may then be placed or mounted on the bracket, with the hooks projecting from the support surface or support surface parts of the bracket being insertable into suitable holes of the retaining surface or retaining surface parts of the support, such that the hooks project through the holes. On the side facing away from the bracket, the hooks project past the retaining surface or retaining surface parts of the support, such that the support can be locked into place by the hooks. In order to guarantee a permanent and secure seat of the parts on one another, at least one latch bar is provided on the support that is slidable parallel to the retaining surface or retaining surface parts of the support. This latch bar is designed in such a way that it is formed with a cutout for the hook, such that the support piece may be simply mounted on the bracket along with the hook or hooks. In the desired installed position, the latch bar is displaced along the retaining surface or retaining surface parts such that the hook extends past the latch bar in the region located adjacent the cutout, thus permanently connecting the parts to one another. The installation process is extremely simple to perform in that the support piece is mounted on the bracket in the correct position and subsequently the latch bar(s) are displaced into the desired installed position, thus achieving a fixed connection of the parts. Additional attachment means such as screws or the like are not needed in this instance. By the same token, the manipulation of screws or the like by installers is not necessary. Both the production and installation can be achieved in an extremely cost-effective and time-saving manner.

Provision is preferably made in this case for two hooks to project on two parallel edges of the support surface or support surface parts of the bracket located at a spacing from one another and for the support to correspondingly be formed with holes on two parallel edges of the retaining surface or retaining surface parts of the support through which the hooks project, and for two latch bars to be provided, each slidable along the edges of the retaining surface or retaining surface parts of the support.

According to this embodiment, hooks are on two parallel edges of the support surface or support surface regions of the bracket. These parallel edges preferably extend parallel to the travel direction of the vehicle equipped therewith. Moreover, these regions extend parallel to the sliding direction of the displaceable latch bar. The latch bars that serve to lock the components into place are each held along the edges on the retaining surface or retaining surface parts of the support in such a way that they are displaceable along the edge but transversely nondisplaceable relative to the longitudinal extension of the edge.

Particularly preferably, provision is made for the bracket to form a rectangular support surface whose parallel longitudinal outer edges are formed with the hooks, with the hooks projecting from the bracket toward the support and with hook noses being formed on the free ends of the hooks formed on the longitudinal outer edges.

This embodiment leads to a permanent and fixed connection of the parts in the desired installed position.

Provision is also preferably made for the support to be designed in an approximate U-shape and to rest against the support surface of the bracket with its base as a retaining surface, with legs of the support projecting from the base away from the support surface of the bracket and with the holes being formed in the base of the support immediately adjacent the legs and the open spaces for the hooks adjacent the holes to be formed in the legs of the support into which the hooks of the bracket engage.

According to this embodiment, the support is designed with an approximate U-shape. On the free ends of the legs, corresponding accessories, for example a pivotable arm rest or the like, may be attached. These legs of the support extend from the base of the support away from the support surface of the bracket in such a way that, after the final installation of the parts, the legs project for example upward in the interior of the vehicle in question. Holes for the hooks to pass through and adjacent apertures for the hook shafts are formed in the base of the support in the vicinity of the legs and passing through the legs. In the desired installed position of the parts, the hooks of the bracket engage in the holes and apertures, and the hooks can be fixed into place by the respective latch bars that have been slid into position. This embodiment allows each latch bar to rest directly against the inner surface of the leg with its side face, with the respective hooks passing through the holes and fitting in the apertures such that the hook, in particular the hook shaft, is recessed. The latch bar is thus able to rest against the inside of the leg in a flat manner without the hook located in the space therebetween.

In order to simplify and facilitate installation, provision is also made for an installation tab to be formed on the bracket near the edge parallel to one hook or each of a plurality of hooks that is located at a spacing from the hook or in front of or between two hooks and projects from the support surface of the bracket with the same orientation as the hook, for the support piece to have a hole as a pass-through in its retaining surface for each installation tab and to have a wall opening in a side wall of the support piece adjacent the retaining surface that is open to the installation tab, for a mounting lever to be provided that, in the installation position, has one end rotationally mounted around an axis in an installation tab and engaging with at least one adjusting nose in cam notches of the latch bar, with the mounting lever extending from the end forming the adjusting nose as a slender lever up to a second end forming a handle and also being provided adjacent the side wall of the support and guided along the side wall.

According to this embodiment, an installation tool is provided that is pivotal about an axis with one end in the installation tab and that engages with its adjusting nose in cam notches of the latch bar. For installation, the parts are pre-positioned relative to one another, with the latch bar then being in its pre-mounting position. The installation tool may then be attached and pivotally supported with the parts forming the axis in the installation tab. Here, the adjusting nose of the lever engages in the cam notches of the latch bar such that, by pivoting the lever around the axis, the latch bar is forcibly displaced into its final installed position. Since the latch bar must be displaced over a fairly long path in order to lock, the lever can engage initially with the adjusting nose in a first cam notch of the latch bar, whereupon the movement of the lever causes a partial push of the latch bar into the desired installed position. The installation tool is then subsequently placed again with its adjusting nose into an additional cam notch of the latch bar and the lever is rotated again around its axis until the final installed position has been reached. The lever may then be removed because it is no longer required after installation. It is preferable for the lever to be designed in such a way that the lever can be inserted in an area between accessories and the support and engages in the cam formation of the latch bar, with the lever penetrating the window-like wall opening with at least its adjusting nose.

In this mount, the lever is guided against the outside of the side wall of the support by the movement it executes during installation.

Depending on the installation needs, the installation tab may be provided on the front or rear end or therebetween, for example toward the middle of the bracket. The hooks and the installation tab may also be aligned with one another or offset from one another in the transverse direction relative to the travel direction of the vehicle. The installation tab may also extend upward relative to the hooks or maybe located behind the hooks. The installation tool may also be partially or completely guided in the latch bar.

In addition, provision is made for the support to form guide and/or support ridges on its retaining surface as well as a side wall, with the latch bar being guided, held, and longitudinally slidable between the ridges and the side wall.

Here, the support is formed with additional guide or support ridges that project essentially upward from the retaining surface with the same orientation as the legs, the legs forming the side wall. The corresponding latch bar may be inserted between these ridges and the side wall and is guided between these parts in a longitudinally displaceable but transversely immobile manner.

In order to secure the final installation position, provision may be made for an elastic detent to be formed on the latch bar that, in the desired position, is engaged in a recess in the retaining surface of the support.

In addition, provision is preferably made for the cutout of the latch bar to be formed by a hole in a side face of the latch bar facing the shaft of the hook, with the recess being formed by two flanks and floor of a groove in the latch bar.

According to this embodiment, although the latch bar is formed as a continuous, bar-shaped element, each cutout is formed by a groove in the side face of the latch bar. The latch bar therefore has a narrower design in this partial region than in the rest of the retaining region. When the parts are attached to one another, the hook is engaged in this hole and extends through this region. The hole is limited by the two flanks and one floor of the groove in the latch bar.

In order to facilitate insertion, provision is made for at least one flank of the groove of the latch bar to be beveled, providing an insertion aid for the hook. This allows parts to be precisely and simply positioned during assembly.

As already stated above, it is preferable for there to be a plurality of the cam notches of the latch bar for the adjusting nose of the installation tool that are adjacent one another in the longitudinal direction or in the shifting direction of the latch bar.

Moreover, the bracket preferably forms wall parts that are adjacent two parallel lateral, lengthwise outer edges and project downward away from the support.

These wall parts of the bracket extending away from the support, which more or less project in the desired installed position, serve to attach the bracket to the structure of the vehicle body.

Here, it is preferable for the hooks to a join a wall part with their base.

This mount achieves a relatively inelastic formation of the hooks on the wall part of the bracket, thus allowing precisely positioned installation.

Under certain circumstances, however, it may be preferred for the hooks to transition with their base into the support surface of the bracket, with the transition area being delimited by slots in the support surface of the bracket surrounding the hook base on the sides.

This allows the hooks to be somewhat elastic in the transverse direction in order to compensate for any production or installation tolerances.

For tolerance compensation, it can also be advantageous for the hooks to be formed with noses that are cut away over part of their width, thus forming elastic hook noses.

Here, provision may preferably be made for the freed parts to be formed between the lateral ends of the hook nose of the hook.

Provision may also be made for the freed part to end openly in a lateral end of the hook nose of the hook.

In any case, it is preferable for the bridge piece formed by the cut in the hook to be bent or directed away from the hook nose toward the base of the hook.

Such an embodiment allows for the latch bar to be fixed by the hook so as to compensate for tolerances.

A refinement of the invention lies in the support surface of the bracket forming a plurality of elastic regions or projections extending from the surface toward the support.

Such elastic regions or projections elastically support the bracket and the support in order to compensate for tolerances and to prevent the generation of noise.

In addition, it is preferred for the bracket to be a bent sheet-metal part in which the hook, the installation tab, and the support surfaces or support surface parts and bent edge pieces are shaped, cut out, and/or bent in one piece from a flat sheet-metal blank.

The support piece itself can be a molded part made of injectable material, in particular plastic and/or metal.

BRIEF DESCRIPTION OF THE DRAWING

Embodiments of the invention are shown in the drawings and described in greater detail below. Therein.

SPECIFIC DESCRIPTION OF THE INVENTION

Figure 1:
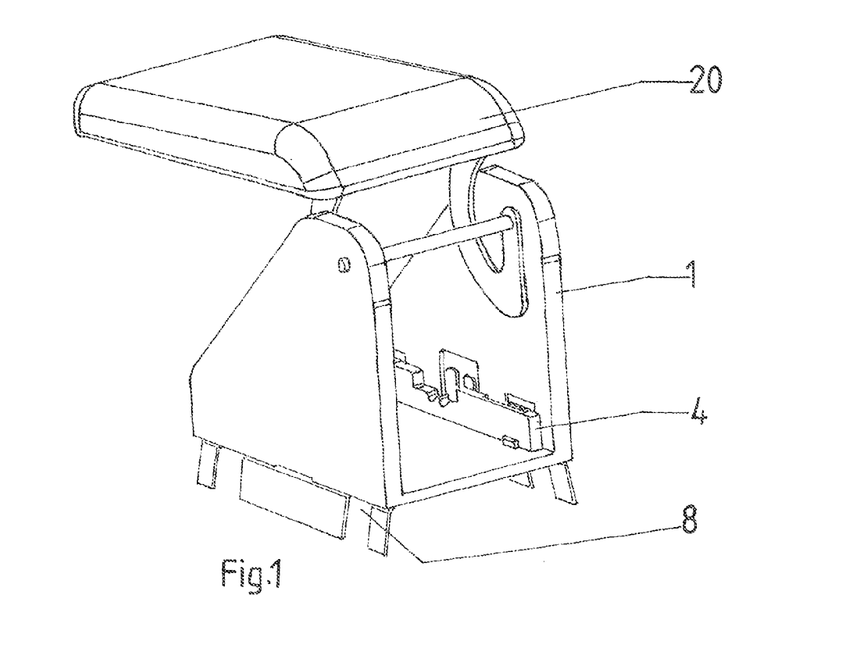
FIG. 1 is an isometric view of a mount according to the invention shown in assembly.
Figure 2:
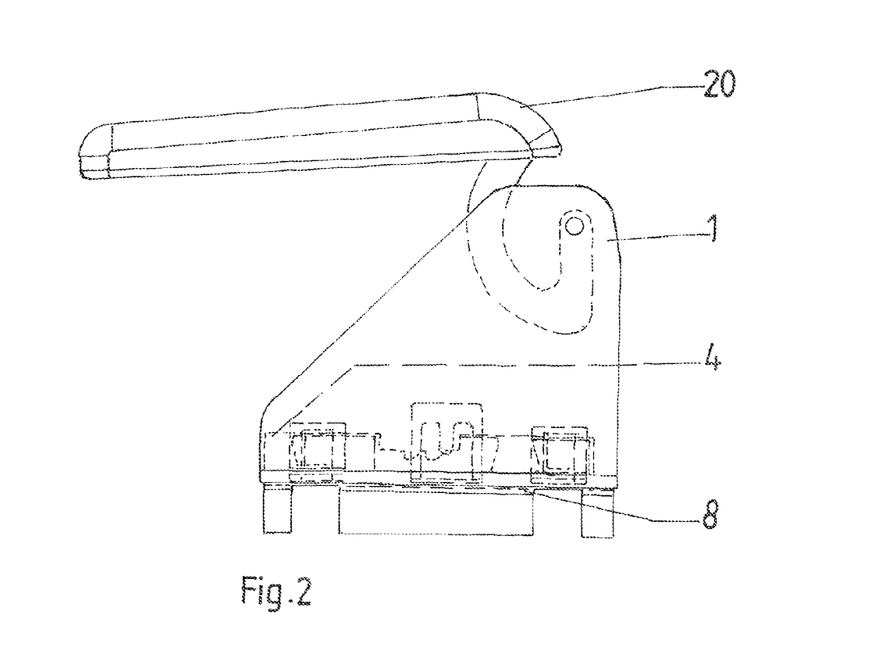
FIG. 2 is a side view of the same.

The drawings show a mount for an accessory of the interior of a motor vehicle on components of the vehicle body. The mount is a bracket 8 that is attached or attachable to the vehicle body and a support 1 detachably connected to the bracket 8, the support being part of the accessory. As shown by way of example in FIGS. 1 and 2, an armrest 20 is pivotally attached to the support 1. Such a mount may be provided for example between the front seats of the vehicle on the transmission tunnel, with the bracket 8 being fixed to the structure of the vehicle body, for example by welding.

Figure 10:
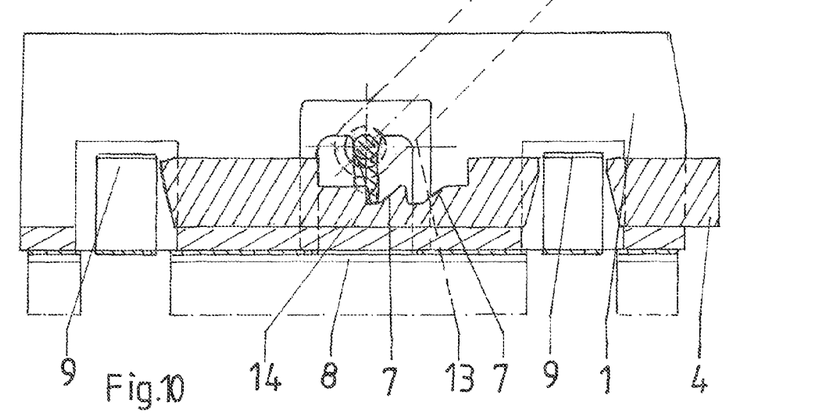
FIG. 10 is a sectional view of the device before installation.
Figure 11:
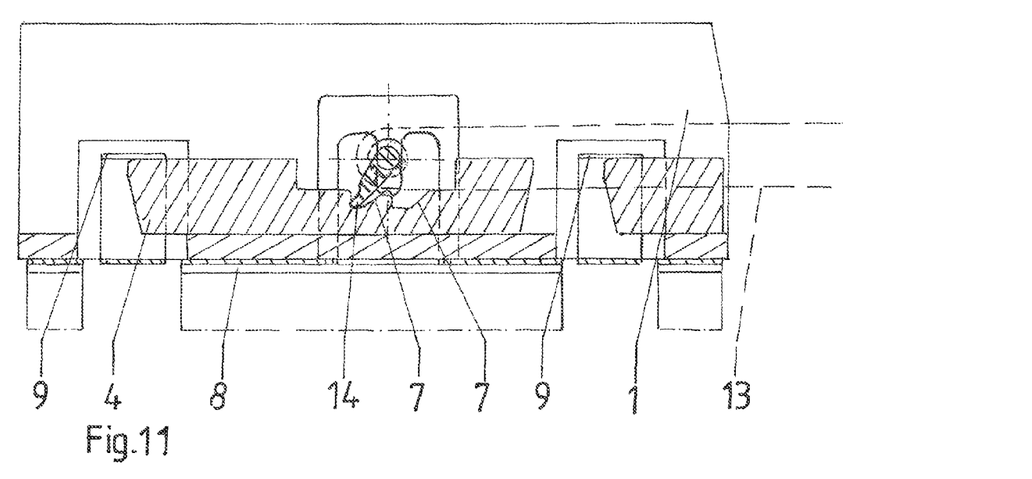
FIG. 11 shows the device in an intermediate installation position.
Figure 12:
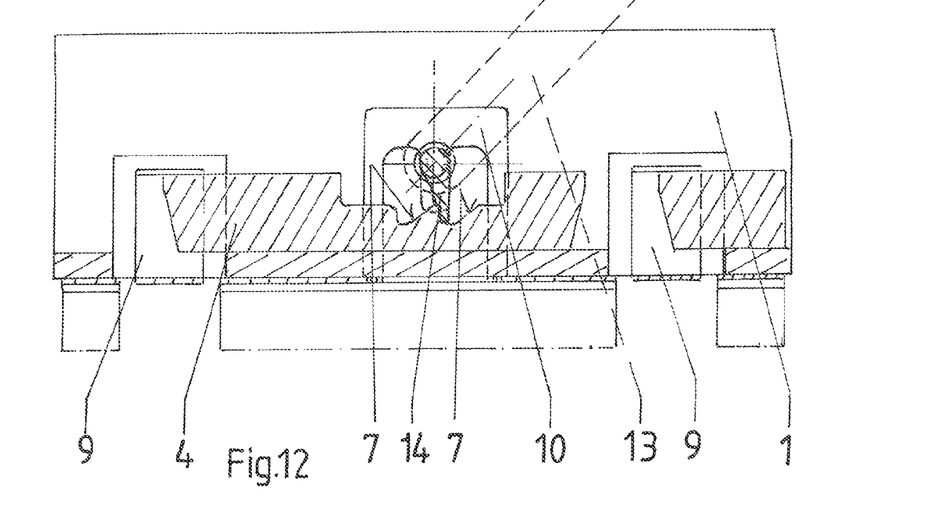
FIG. 12 shows it in an intermediate installation position.
Figure 13:
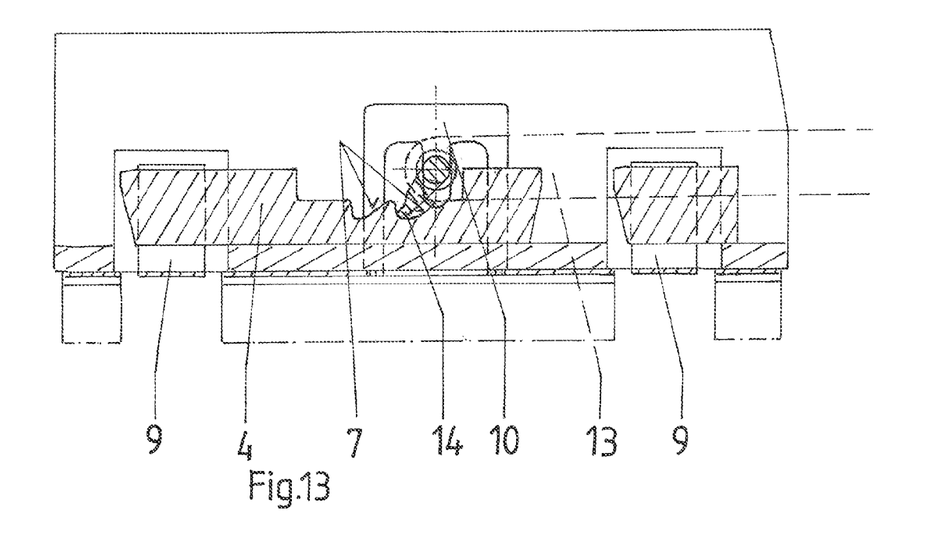
FIG. 13 shows it in a final installed position.

The bracket 8 forms support surfaces or support surface parts on which the support 1 rests with a retaining surface or retaining surface parts in the desired installed position. In this embodiment, four hooks 9 project upward from the support surface or support surfaces of the bracket 8 in the operating position. In the desired installation position, these hooks 9 penetrate a complementary hole 2 of the retaining surface or retaining surface parts of the support 1. In the operating position, the hooks 9 project from on the side facing away from the bracket 8 past the retaining surface or the retaining surface parts of the support 1 as shown for example in FIGS. 1, 2, 4, 7, 8, 9, 10, 11, 12, 13, and 14. In the illustrated embodiment, two latch bars 4 are slidable on the support 1 parallel to its retaining surface or retaining surface parts such that they may be displaced from their position of FIG. 10 through the position of FIG. 11 and into the position of FIG. 13, i.e. from right to left in the drawing.

Figure 18:
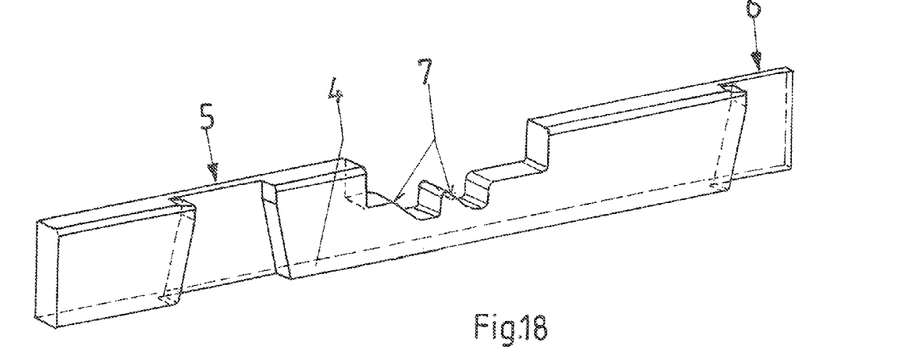
FIG. 18 is a perspective view of a latch bar.
Figure 19:
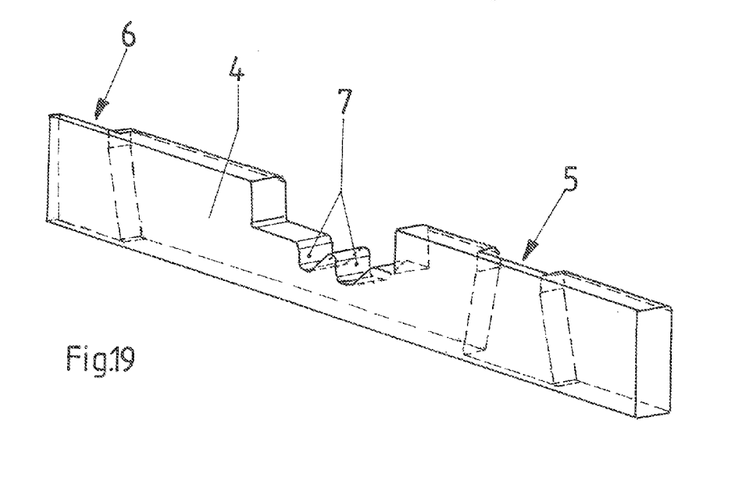
FIG. 19 shows it as viewed from the other side.
Figure 20:
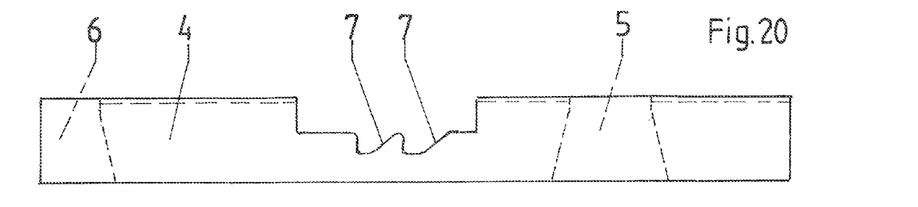
FIG. 20 is a side view of the latch bar.
Figure 21:
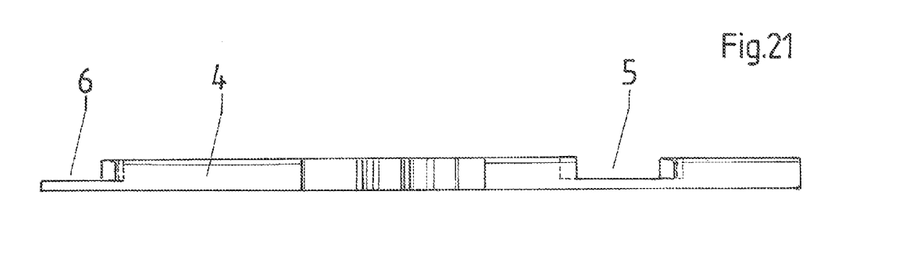
FIG. 21 is a top view of the latch bar.

The latch bars 4 are formed with cutouts 5 and 6 as shown for example in FIGS. 18 and 19 that are provided for the hooks 9 to project through. During installation the hooks 9 are engaged through these cutouts 5 and 6. The latch bars 4 are subsequently slid into their desired installed position so that the bent ends of the hooks 9 overhang them and the individual parts are connected to one another.

Figure 3:
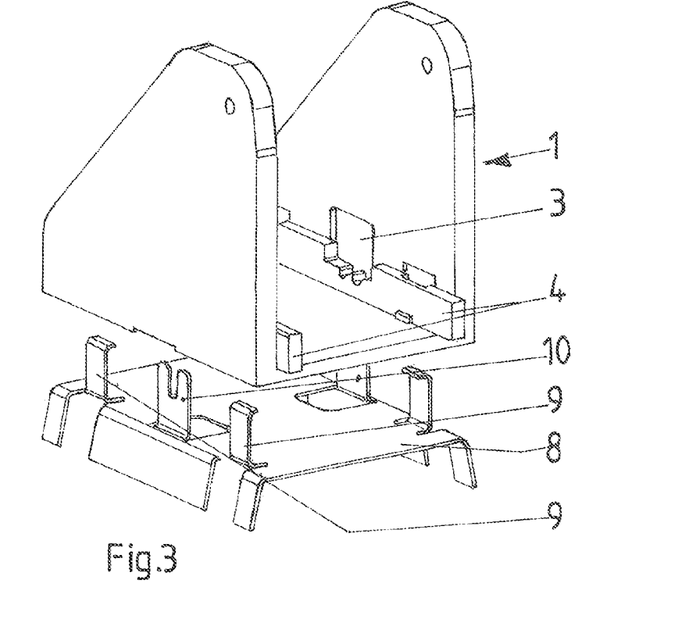
FIG. 3 shows the parts before installation.
Figure 4:
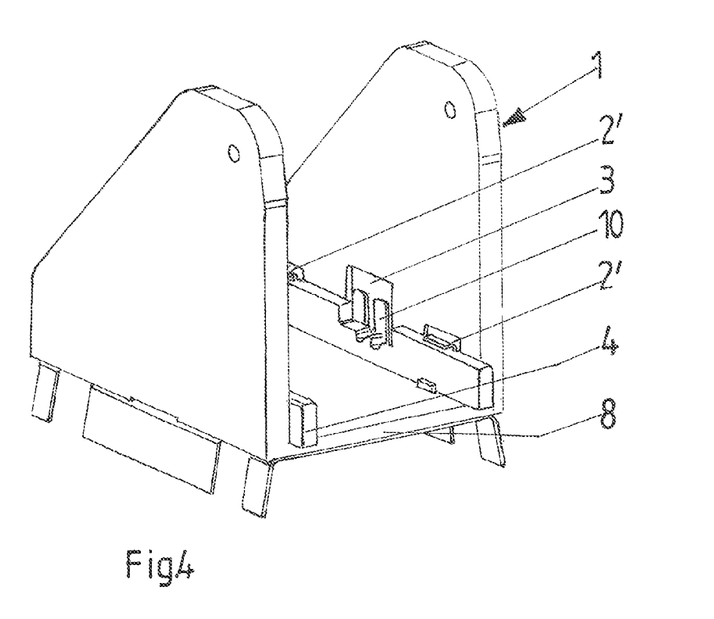
FIG. 4 shows them same in a final installed position.
Figure 5:
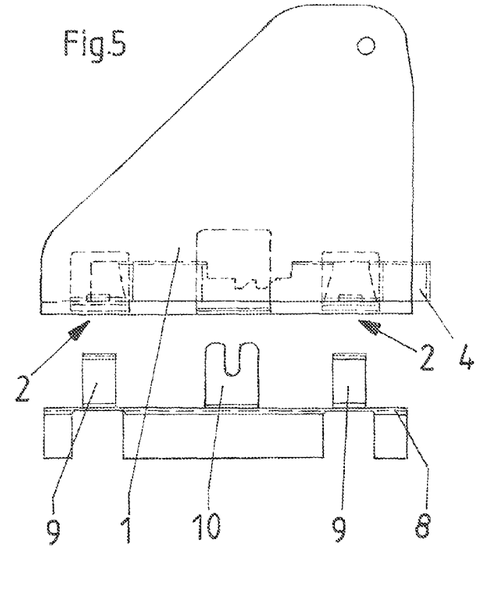
FIGS. 5 and 6 shows them before installation in different views.
Figure 6:
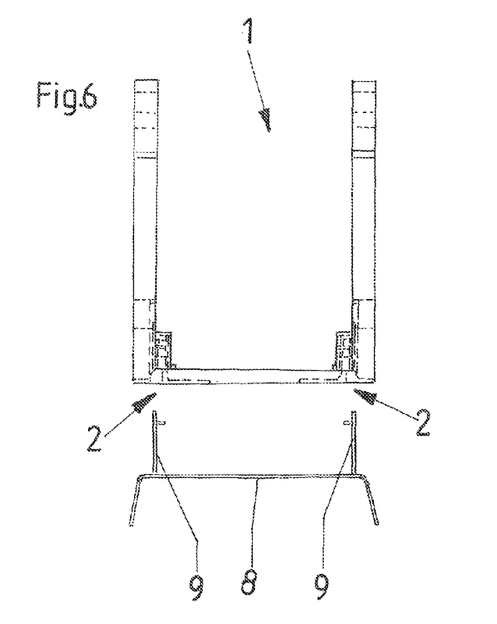
Figure 7:
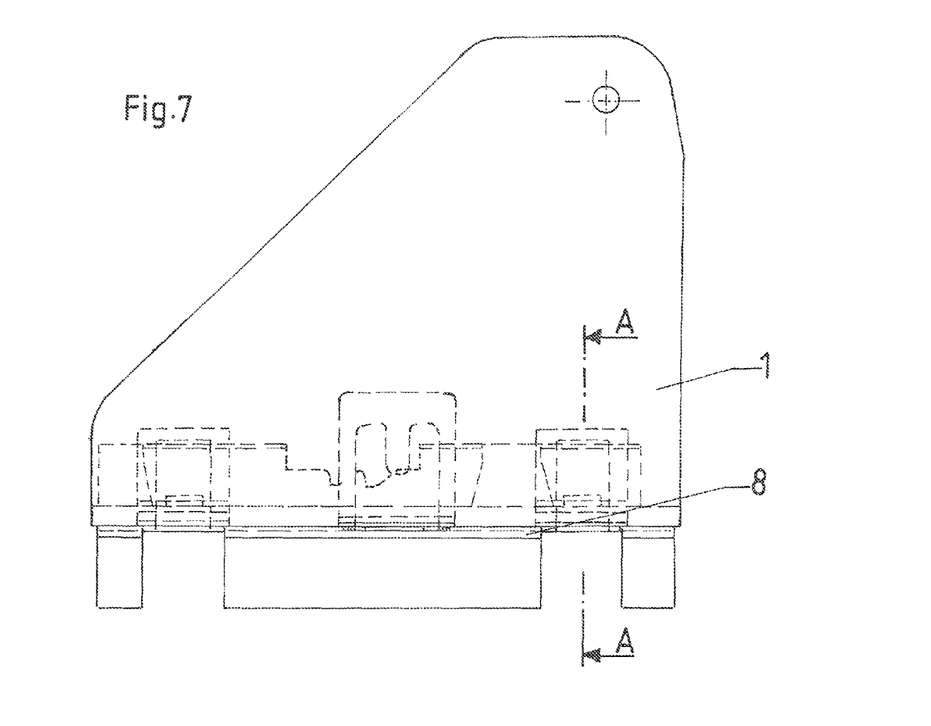
FIG. 7 shows them installed position in a side view.
Figure 8:
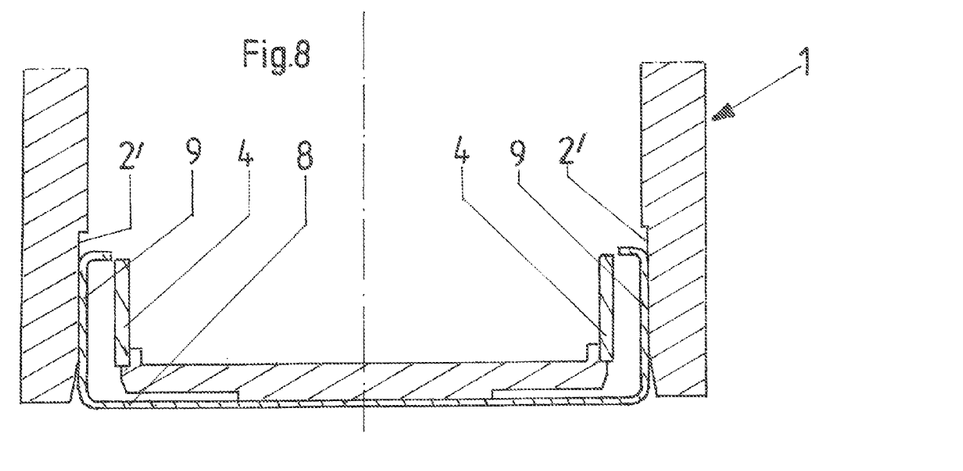
FIG. 8 shows the assembly with the latch bar prepositioned.
Figure 9:
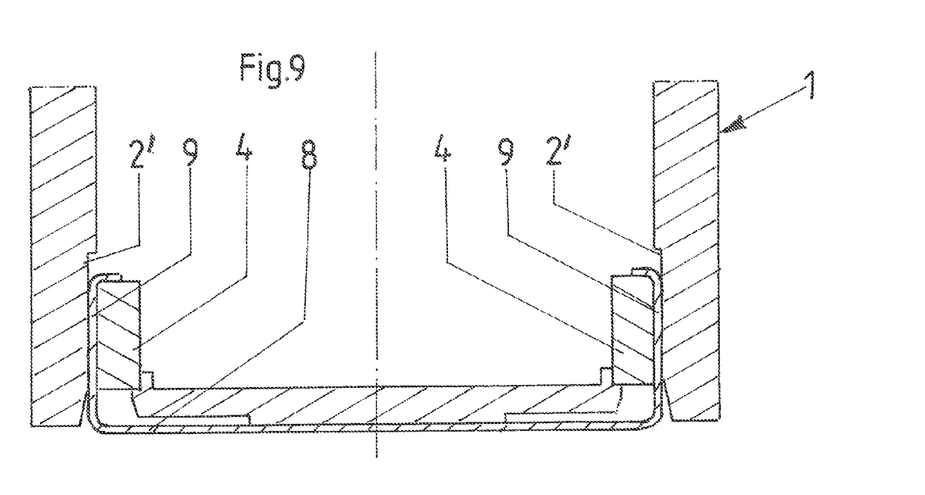
FIG. 9 shows them in the final position of the latch bar in section.

As may be seen in FIGS. 3 and 4 for example, two parallel edges of the support surface of the bracket 8 are each embodied with two of the hooks 9 at a spacing from one another. The support 1 is formed with respective holes 2 on two edges of its retaining surface parallel to one another, through which the hooks engage in the installed position. The two latch bars 4 are each slidable along the edges of the retaining surface of the support 1. Correspondingly sizing the holes 2 allows for a tolerance compensation at least in the range of a few millimeters, with the holes 2 being designed to be correspondingly larger in the longitudinal direction of the support, i.e. in the travel direction of the vehicle equipped therewith.

The bracket 8 forms an essentially rectangular support surface whose parallel longitudinal outer edges are formed with the hooks 9 that project upward from the bracket 8 toward the support 1. On their free ends, the hooks 9 on the opposite longitudinal outer edges have noses projecting toward one another, as shown for example in FIG. 3. The support 1 has an approximate U-shape and its base serves as the retaining surface resting on the support surface of the bracket 8 (in the desired installed position), with legs of the support 1 projecting from the base downward away from the support surface of the bracket 8. The holes 2 are formed immediately adjacent the legs in the base of the support 1, with apertures 2' for the hooks 9 extending from the holes 2. In the desired position, the hooks are thus able to project through the holes 2 into the apertures 2' and do not deposit relative to the inner wall of the leg of the support 1, such that the latch bar 4 rests flat on the corresponding parallel surface of the leg of the support 1.

Figure 15:
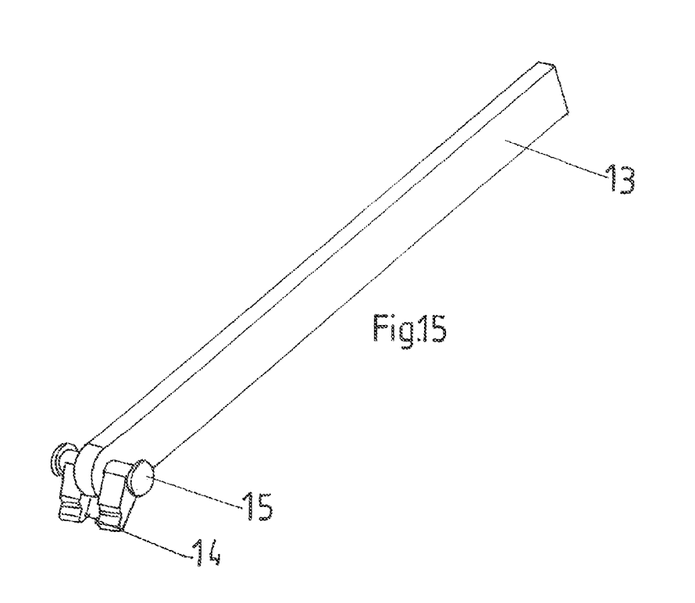
FIG. 15 is a perspective view of an installation tool.
Figure 16:
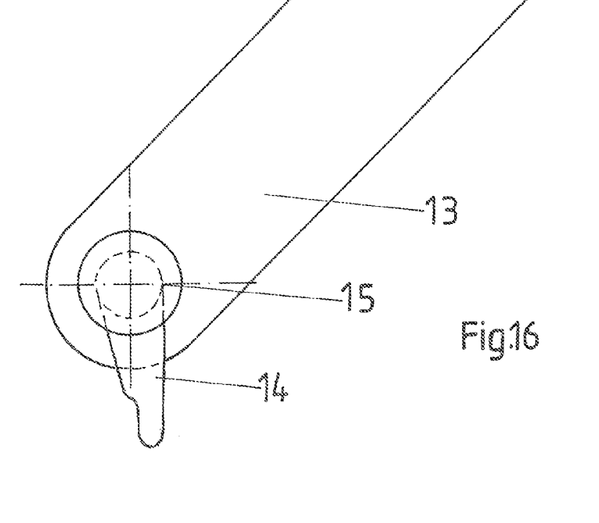
FIGS. 16 and 17 are details of the tool in various views.
Figure 17:
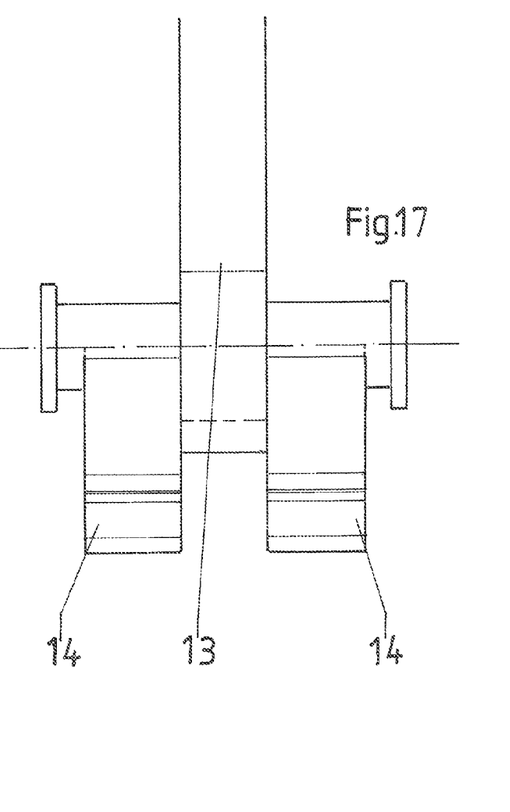

An installation tab 10 is also formed on the bracket 8 near the edge and equispaced between two hooks 9. The installation tab projects upward from the support surface of the bracket 8 like the hooks 9. The support 1 has holes 3 in its retaining surfaces for the installation tabs 10. When mounting the support 1, each installation tab 10 is able to engage from below in a respective one of the holes 3 and to be positioned laterally in the respective hole 3 as shown for example in FIG. 4. Here, the installation tab 10 is accessible from inside, i.e. between the legs of the support 1. The side wall of the support 1 adjacent the retaining surface is also formed with a wall opening or wall hole that is open and fits the installation tab 10. Moreover, an installation tool 13 is provided as shown in FIGS. 15 to 17 and as shown in an installation aid position in FIGS. 10 to 14. This installation tool 13 is designed to pivot about an axis 15 with one end fitted in the installation tab 10 that is formed as a gudgeon. The installation tool is formed with an adjusting nose 14 that engages in cam notches 7 of the latch bar 4. The installation tool 13 is elongated and extends from the end formed with the adjusting nose 14 as a slender lever up to an outer handle end. In its installation motion, the lever is guided against the lateral wall of the support 1. For installation, the lever is fitted in the position shown in FIG. 10 with its adjusting nose 14 in the corresponding cam notches 7 and rotated out of this position of FIG. 10 clockwise by a corresponding angle to the position of FIG. 11. Here, the latch bar 4 is partly gripped by the bent hook end of the hook 9. The lever 13 is subsequently repositioned and guided into the position shown in FIG. 12. From this position, the lever is again rotated clockwise into the position of FIG. 13 such that the bent end of the hook 9 engages completely over the upper edge of the respective latch bar 4. When activating the lever 13, the installer's hand is placed on the free outer end (for example, FIGS. 10 and 12). The installer moves the lever 13 downward into the position of FIG. 11 and FIG. 13, with this motion being supported by the installer's body weight, which is particularly advantageous during installation on an assembly line.

The support 1 is also formed with guide or support ridges on its retaining surface, one of which may be seen in FIGS. 3 and 4 on the right-hand side. The latch bar 4 is slidable between these support ridges and the side wall of the support 1.

Figure 14:
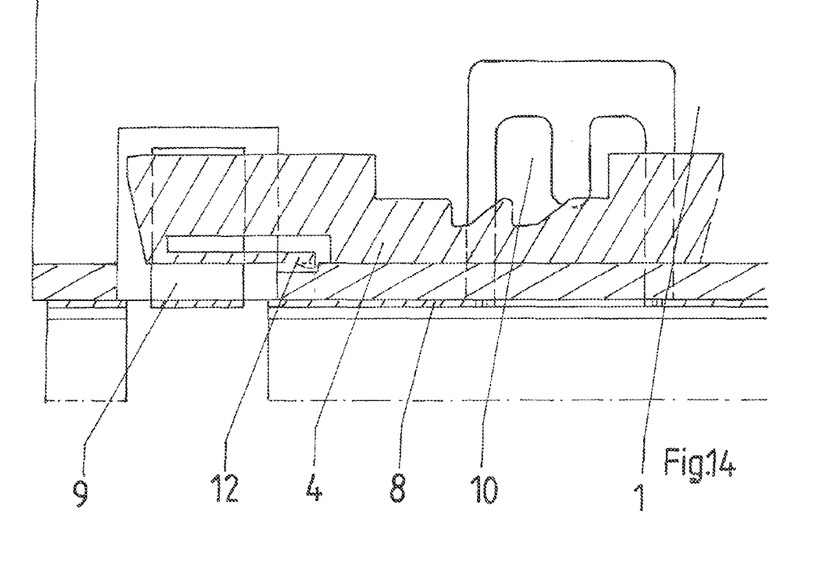
FIG. 14 is a sectional view in a final installed position.

In addition, as shown in FIG. 14, an elastic detent 19 may be provided on the latch bar 4 that, in the desired installed position, is engaged in a recess in the retaining surface of the support 1 as shown in FIG. 14.

As shown in FIGS. 18 and 19, the cutouts 5 and 6 of the latch bar 4 are each formed by a groove in a side surface of the latch bar 4 that faces the hook 9 in the desired installed position. Here, the cutouts are formed by two flanks and one floor of the respective groove in the latch bar 4. In the illustrated embodiments, at least one flank of the groove (of the holes 5 and 6) is beveled to form an insertion aid for the hook 9, as shown in FIGS. 18 in 19.

Figure 22:
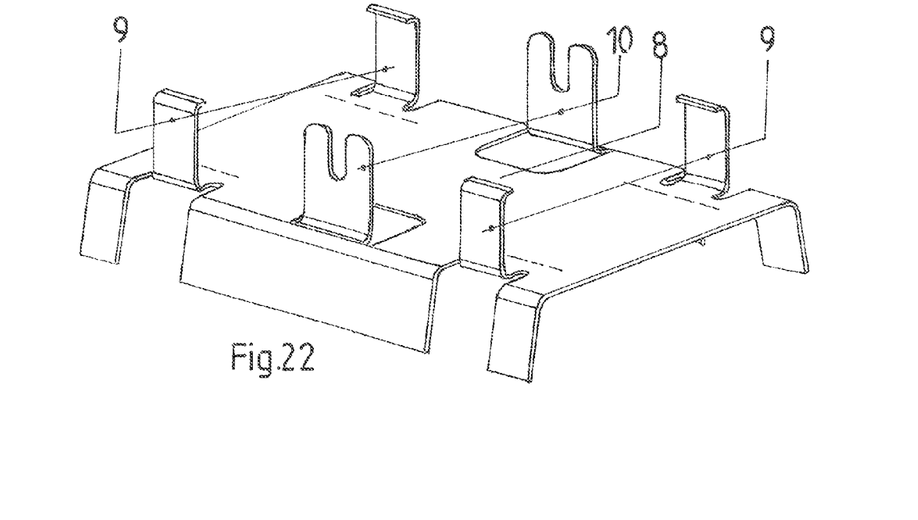
FIG. 22 is a perspective view of a bracket.
Figure 23:
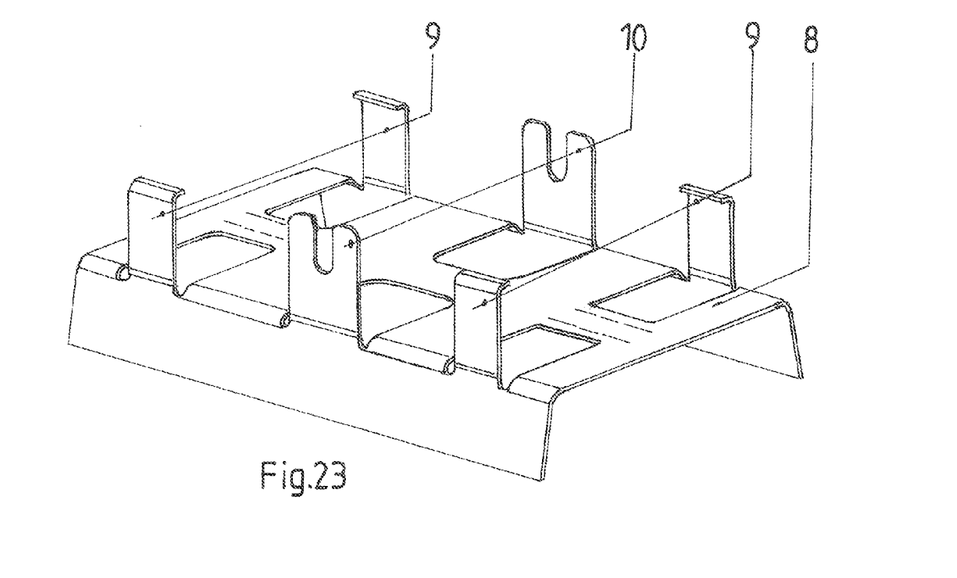
FIG. 23 is a bracket variant in the same view.
Figure 24:
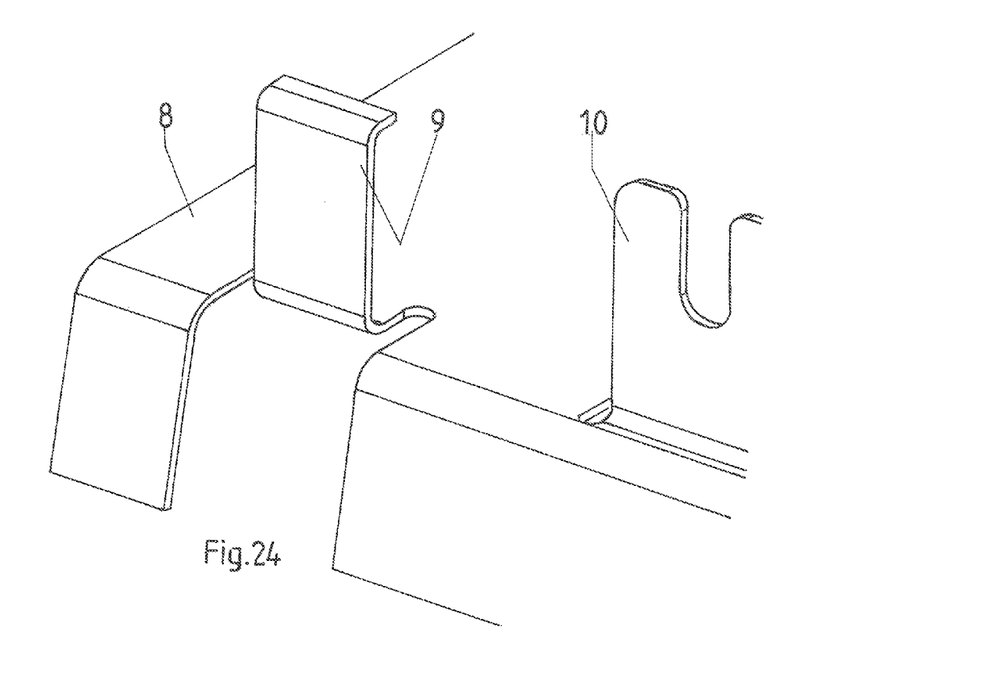
FIG. 24 is a detail of FIG. 22 in an enlarged scale.

The bracket 8 moreover is formed with wall parts on two parallel longitudinal outer side edges projecting downward away from the support 1 that can be used for connecting to the structure of the vehicle body. The hooks 9 adjoining the wall part with their base, the wall part projecting downward as shown in FIG. 23, thus forming a relatively rigid structure. Alternately, the hooks 9 may transition with their bases into the support surface of the bracket 8, as shown in FIG. 22, with the transitional region being formed between slots in the support surface of the bracket 8 that laterally flank the base of the hook. This allows a certain elasticity of the hooks 9 to be achieved in order to compensate for tolerances.

Figure 25:
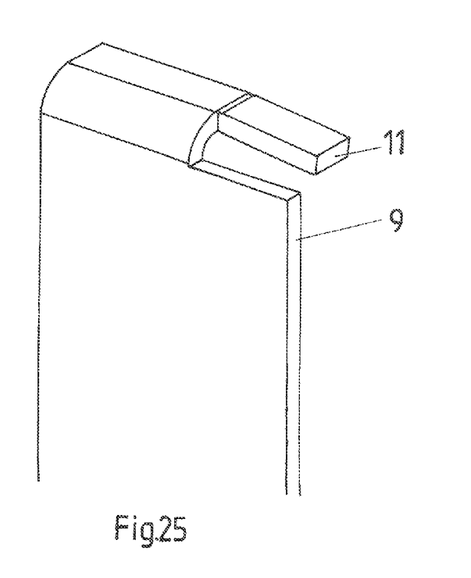
FIG. 25 is a perspective view of a variant.
Figure 26:
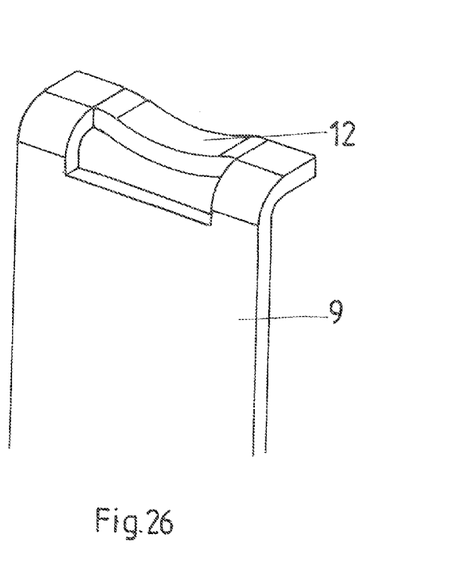
FIG. 26 is a perspective view of another variant.

Another feature may be found in the embodiment shown in FIGS. 25 and 26. Here, the hooks 9 have ends that project laterally to form elastic hook noses 11. In the embodiment of FIG. 25, the free cut is performed over part of the width of the hook nose to form the elastic hook noses 11. In the embodiment of FIG. 26, a cutout is formed between the ends of the hook nose of the hook 9 such that an elastic center region 12 is available to compensate for tolerances. In the embodiment of FIG. 25, the free cut ends open at ends of the hook nose of the hook 9. In both embodiments, the freed part of the hook 9 is bent or directed away from the hook nose toward the base of the hook as is necessary for compensating for tolerances.

Figure 27:
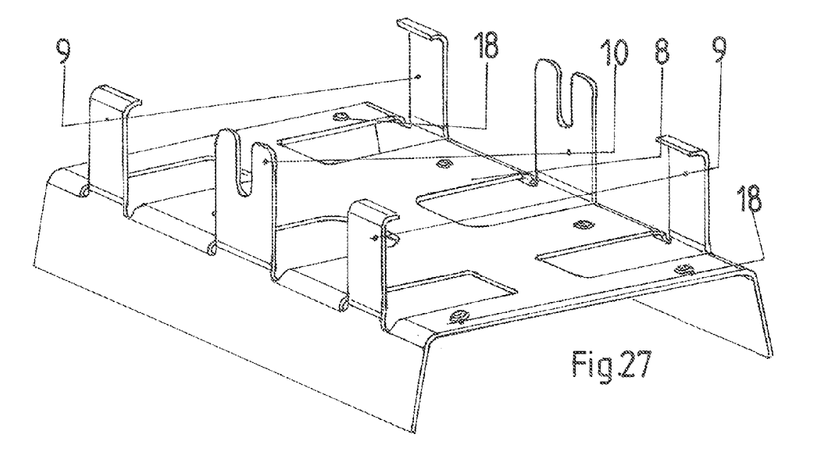
FIG. 27 is a perspective view of a bracket.
Figure 28:
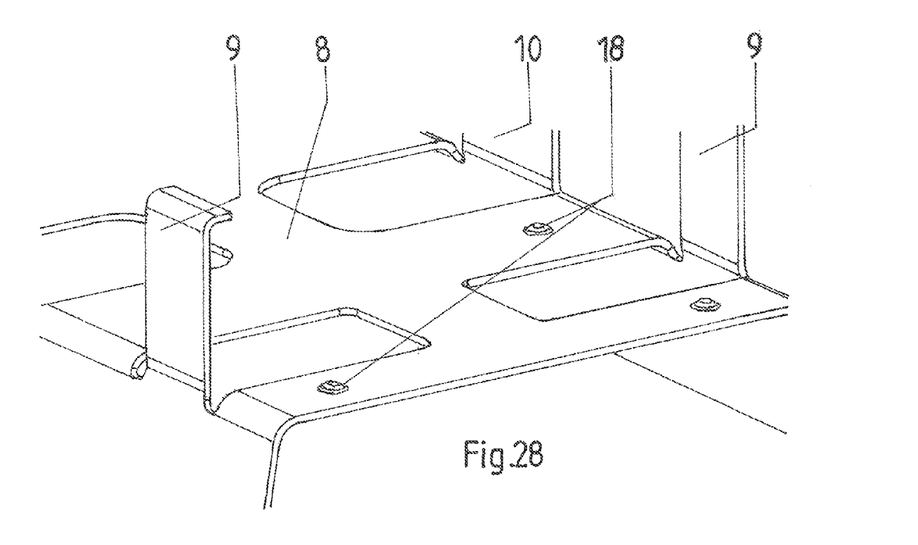
FIG. 28 is a large scale sectional view of a detail of FIG. 27.
Figure 29:
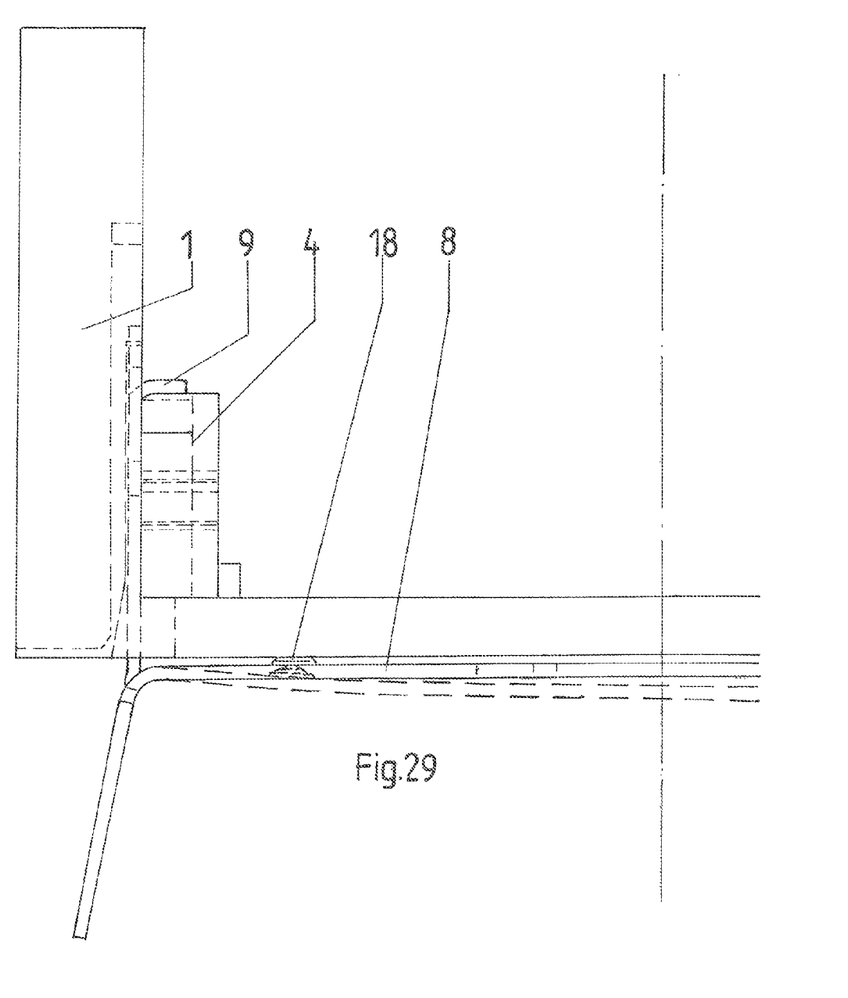
FIG. 29 is a front view.

As shown in FIGS. 27 to 29, the support surface of the bracket 8 has a plurality of elastic regions or projections 18 projecting upward from its surface toward the support 1 that also serve to compensate for tolerances as shown in FIG. 29.

In all embodiments, the bracket 8 is a bend sheet metal part in which the hook 9, the installation tab to 10, and the support surfaces or support surface parts and bent edge parts are shaped, cut out, or bent in one piece from a flat sheet metal blank. The hooks 9 and the installation tabs 10 may be advantageously cut out of the molded sheet metal peace forming the bracket 8 and positioned such that no scrap or a negligible amount of scrap results. In addition, the bracket 8 may be reinforced by molded crimps that may be provided on the end of the cuts in particular for the hook 9 running transverse to the cut, as shown in FIG. 23, or even adjacent the cut edges of the hook 9 as shown in FIG. 22, both in front of the contours and transverse to the contours, as shown in FIGS. 22 and 23 by dashed lines.

In contrast, the support piece 1 is molded of injectable material, in particular plastic or metal.

The particular advantage of the mount according to the invention lies in the fact that the support 1 may be simply mounted on the bracket 8 in that it is placed from above on the bracket 8 and the latch bar 4 is subsequently slid into the desired installed position such that the parts are then interlocked with one another and available for use.

The invention is not limited to the illustrated embodiments, but rather is variable in many ways within the scope of the disclosure. All individual and combined features disclosed in the specification and/or drawings are to be viewed as essential to the invention.

The invention claimed is:

1. A mount for an accessory in the interior of a motor vehicle on components of the vehicle body, comprising:
   a bracket mountable or mounted on the vehicle body and having a base;
   a support removably connected to the bracket as part of the accessory, the bracket forming a support surface having two edges and against which the support rests with a retaining surface,
   two spaced hooks projecting from each of the edges of the support surface formed by the base of the bracket, through respective holes of the retaining surface of the support, and past the retaining surface on a side facing away from the bracket; and
   two latch bars slidable at the edges on the support surface parallel to its retaining surface and formed with cutouts fitting with the hooks in a desired installed position;
   an installation tab formed on each of the edges of the bracket aligned with the respective hooks, the installation tabs each being located at a spacing from the hooks of the respective edge and projecting from the support surface of the bracket with the same orientation as the hooks, the support being formed with respective holes in its retaining surface as pass-throughs for the installation tabs and formed adjacent each such hole with a respective wall opening in a side wall of the support adjoining the retaining surface, each installation tab being formed with a cam notch;

an installing lever having at one end a nose fittable and pivotal in an installation position in the installation tab and engages with at least one adjusting nose in a cam notch of the latch bar, with the installation tool extending from the end having the nose as a slender lever up to a second end as a handle and being provided adjacent the side wall of the support guided against the side wall.

2. The mount according to claim 1, wherein the bracket forms a rectangular support surface whose parallel longitudinal outer edges are formed with the hooks, the hooks projecting from the bracket toward the support and having hook noses directed toward one another on free ends of the hooks on the opposite longitudinal outer edges.

3. The mount according to claim 1, wherein the support is designed with an approximate U-shape and rests with its base as a retaining surface against the support surface of the bracket, with legs of the support piece projecting from the base away from the support surface of the bracket and with the holes being immediately adjacent the legs in the base of the support and with apertures for the hooks being formed in the legs of the support adjoining the holes into which the hooks of the bracket engage.

4. The mount according to claim 1, wherein the support is formed with guide and support ridges on its retaining surface as well as a side wall, with the latch bar being guided, held, and longitudinally slidable between the ridges and the side wall.

5. The mount according to claim 1, further comprising:
an elastic detent formed on the latch bar that, in a desired end position, is locked into a recess in a retaining surface of the support.

6. The mount according to claim 1, wherein the cutout of the latch bar is formed by a recess in a side face of the latch bar facing a leg of the hook, the recess being formed by two flanks and one floor of a groove in the latch bar.

7. The mount according to a claim 6, wherein at least one flank of the groove of the latch bar is beveled to form an insertion aid for the hook.

8. The mount according to a claim 1, wherein there are a plurality of the cam notches in the latch bar for the adjusting nose of the installation tool that are spaced from one another in a longitudinal sliding direction of the latch bar.

9. The mount according to claim 1, wherein the bracket is formed with wall parts adjoining two parallel side longitudinal outer edges directed away from the support.

10. The mount according to claim 9, wherein the hooks adjoin respective side walls of the base.

11. The mount according to claim 9, wherein the hooks merge with their base into the support surface of the bracket at transition regions formed by the slots laterally flanking the hook base in the support surface of the bracket.

12. The mount according to claim 1, wherein the hooks are formed with hook noses that are free over part of their width to form elastic hook noses.

13. The mount according to claim 12, wherein a cut is formed between the lateral ends of the hook nose of the hook.

14. The mount according to claim 12, wherein a cut ends openly at a lateral end of the hook nose of the hook.

15. The mount according to claim 12, wherein a free part end of the hook formed by the cut is bent or directed away from the hook nose toward the base of the hook.

16. The mount according to claim 1, wherein the support surface of the bracket has a plurality of elastic regions or projections extending from the surface toward the support.

17. The mount according to claim 1, wherein the bracket is a bent sheet-metal part in which the hook, the installation tab, and the support surfaces and bent edge parts are shaped, cut out, and/or bent in one piece from a flat sheet metal blank.

18. The mount according to claim 1, wherein the support is molded or of metal.

* * * * *